April 22, 1924.
S. E. WINDER
1,491,369
GLASS MANUFACTURING MACHINERY
Filed March 20, 1920   11 Sheets-Sheet 4
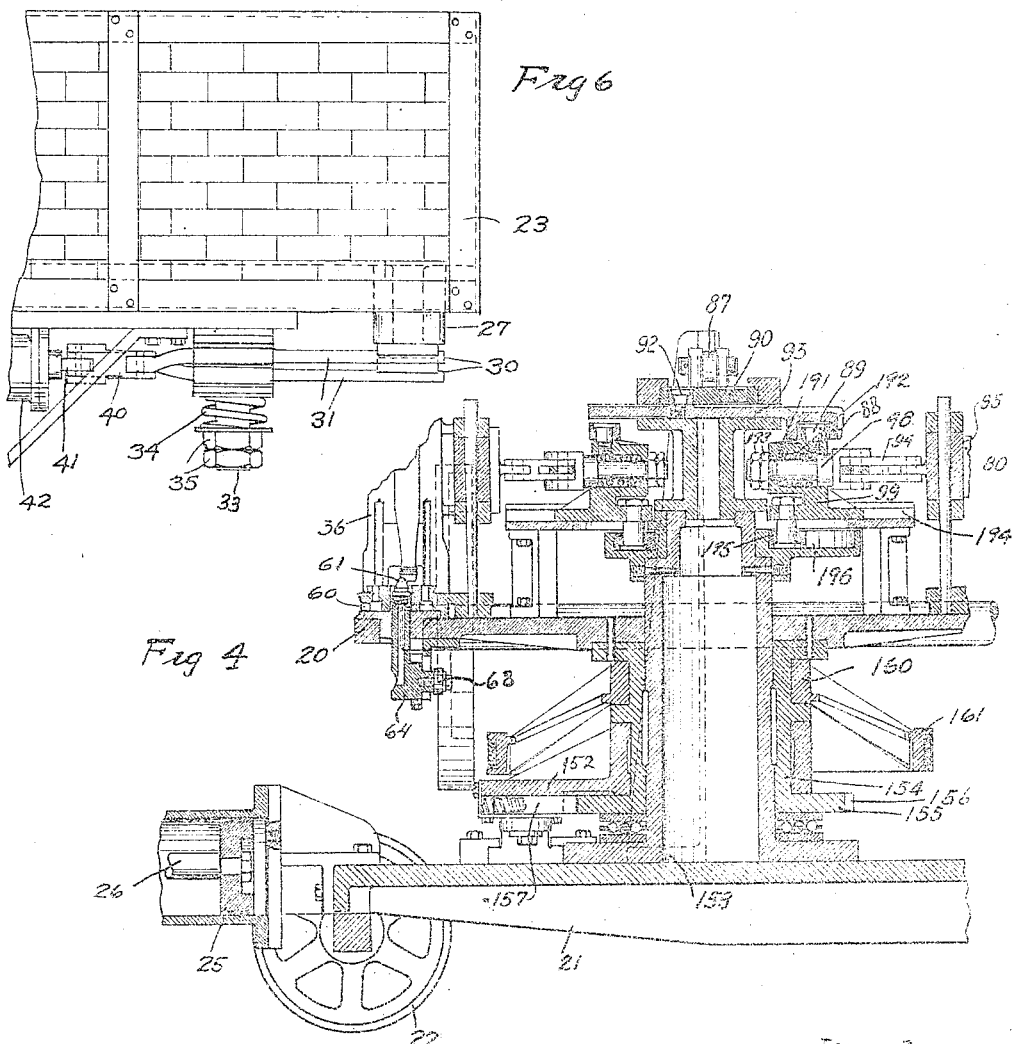

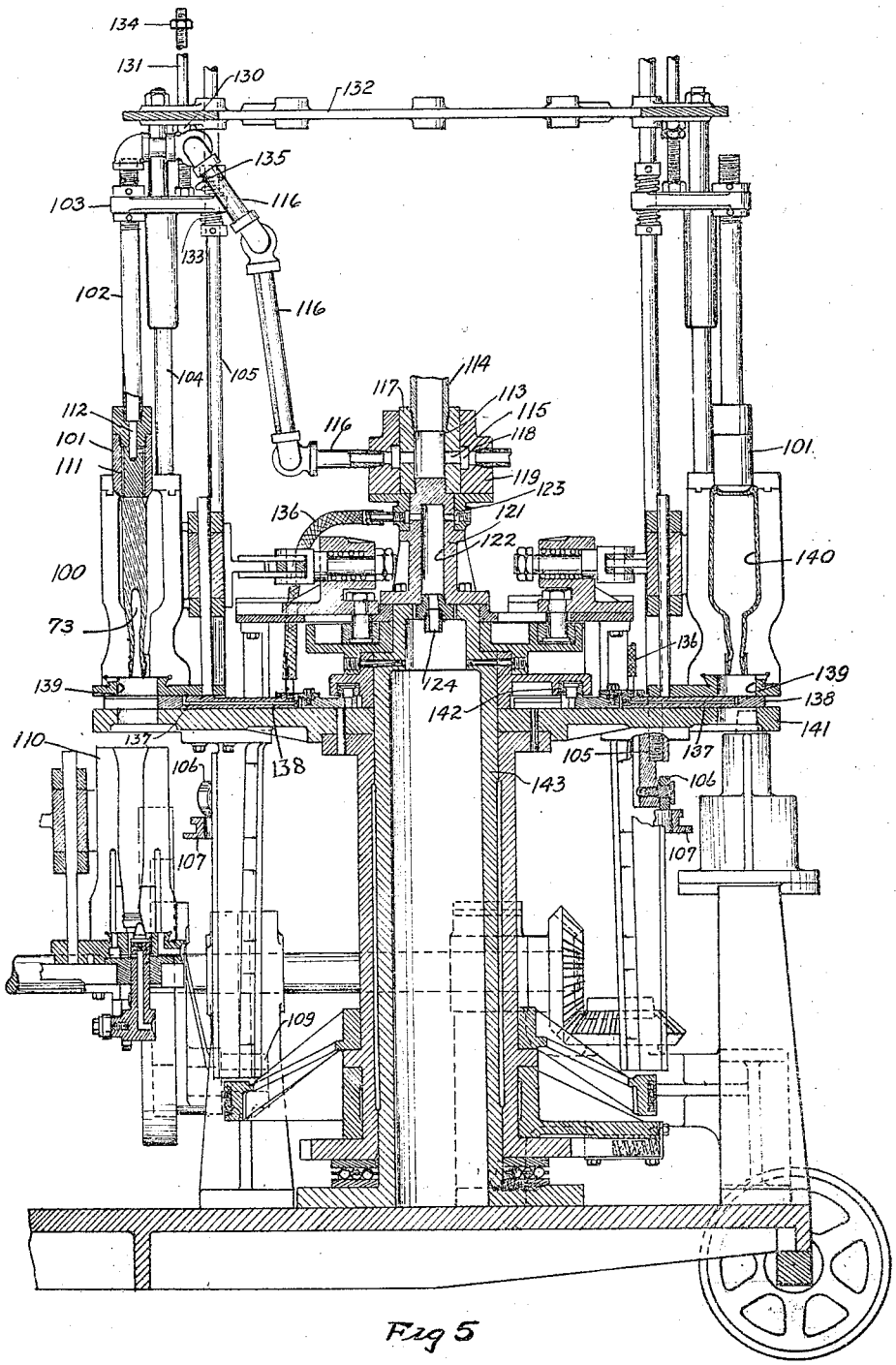

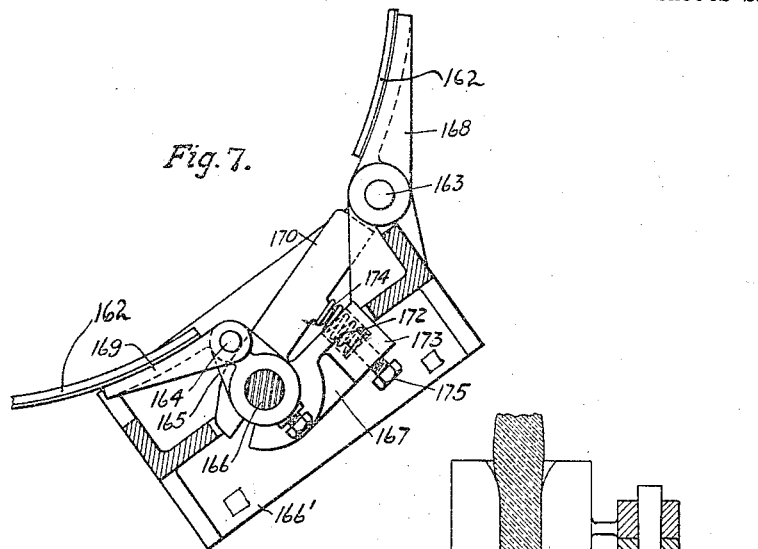
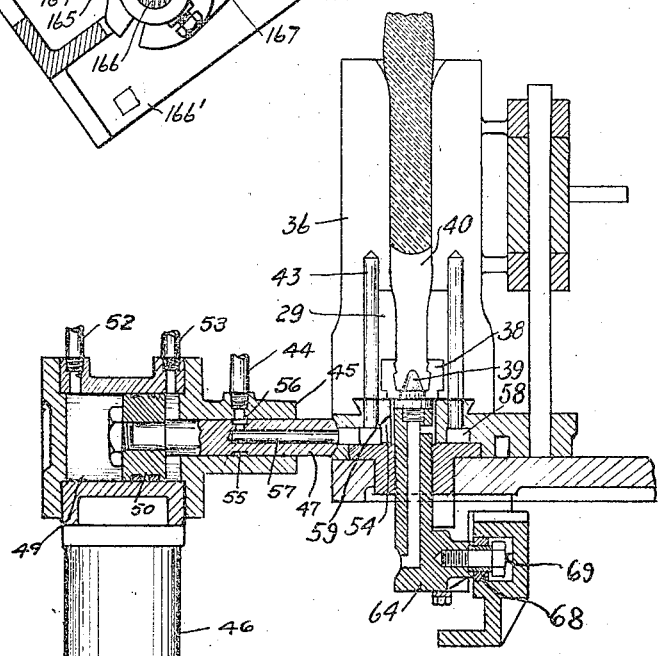
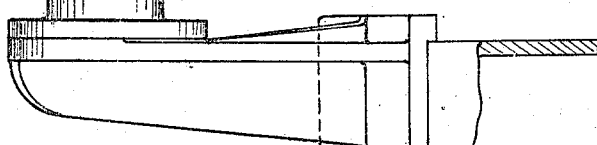

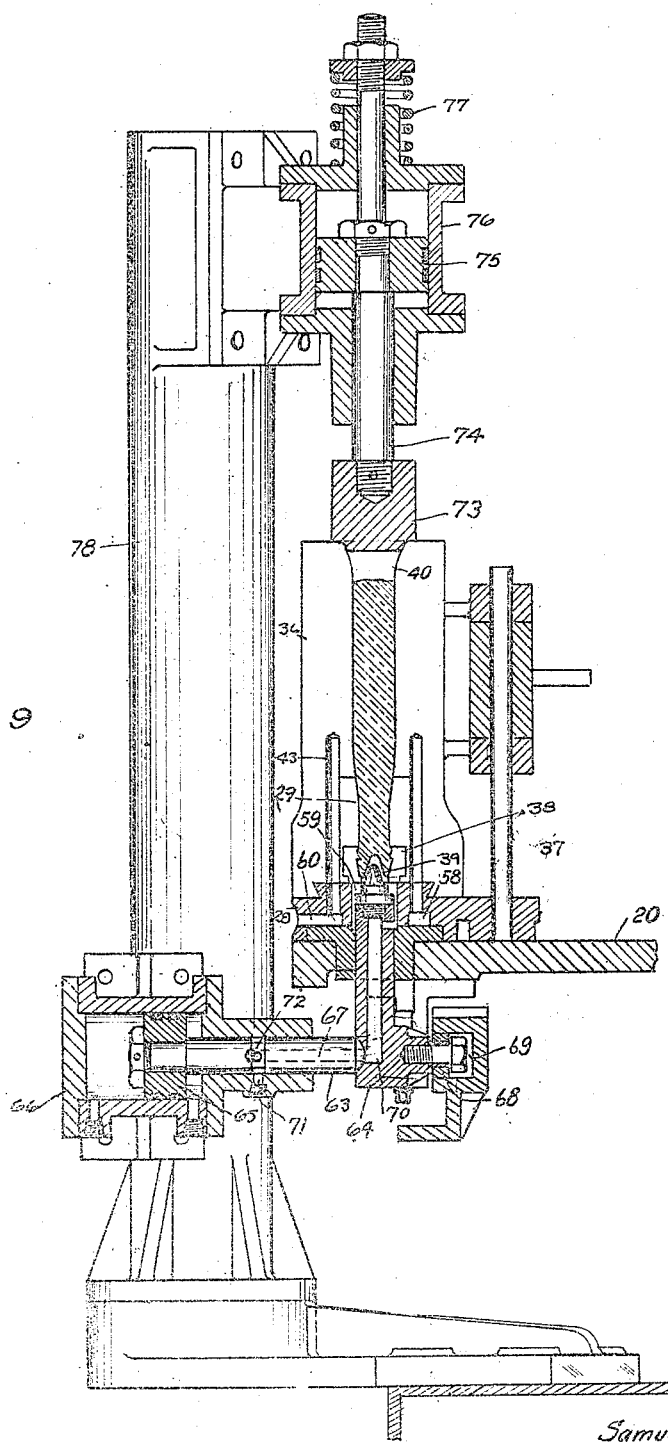

April 22, 1924.
S. E. WINDER
GLASS MANUFACTURING MACHINERY
Filed March 20, 1920    11 Sheets-Sheet 8
1,491,369
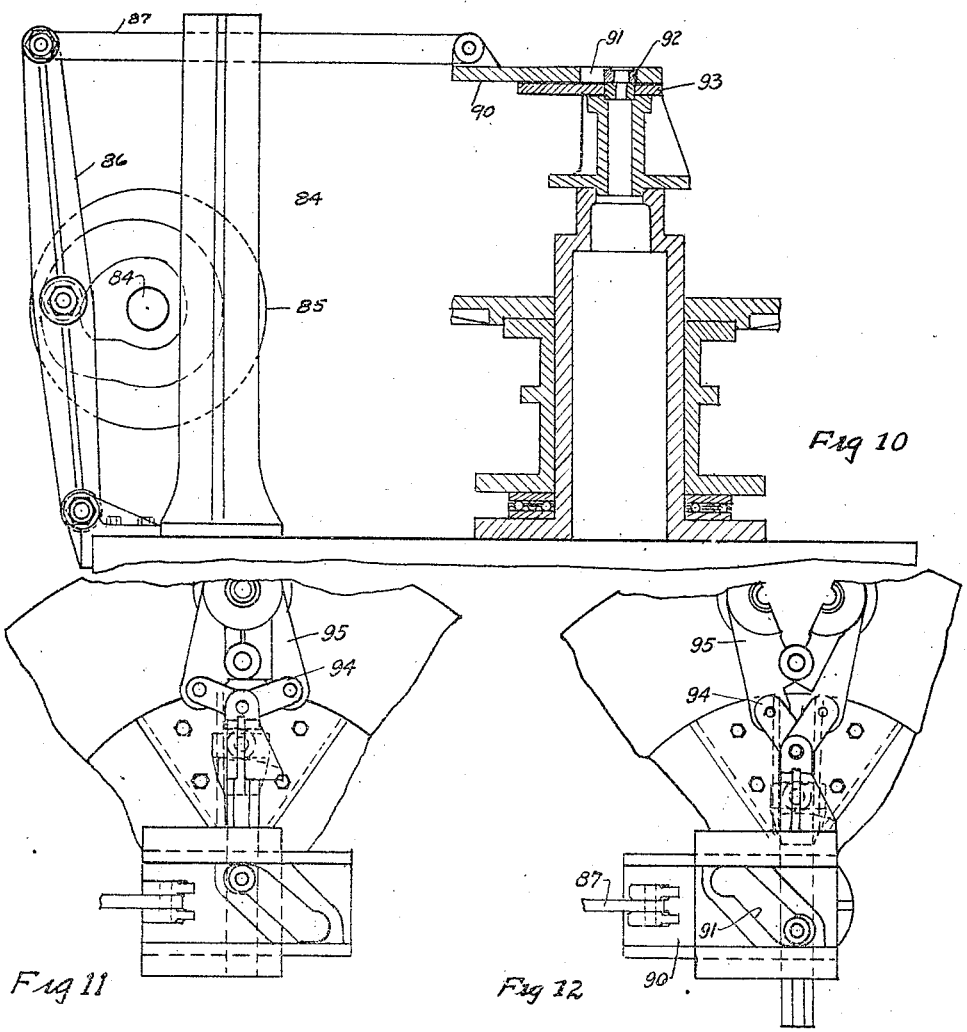

April 22, 1924.

S. E. WINDER 1,491,369

GLASS MANUFACTURING MACHINERY

Filed March 20, 1920    11 Sheets-Sheet 9

Inventor.
Samuel E. Winder
Andrews & Lundell
Attys.

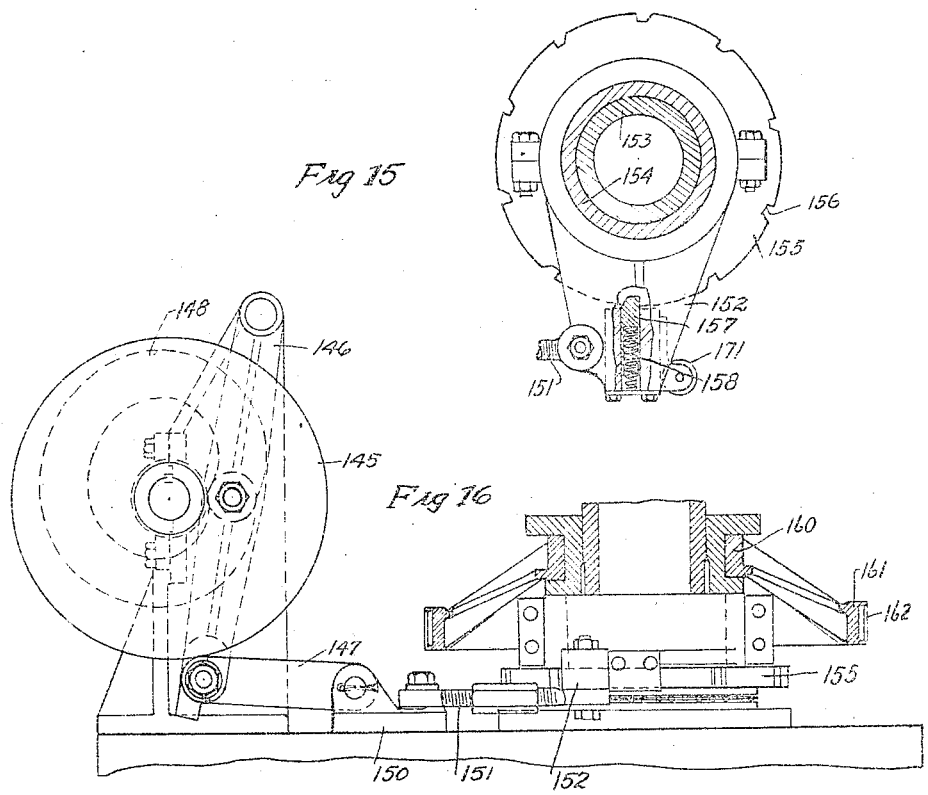
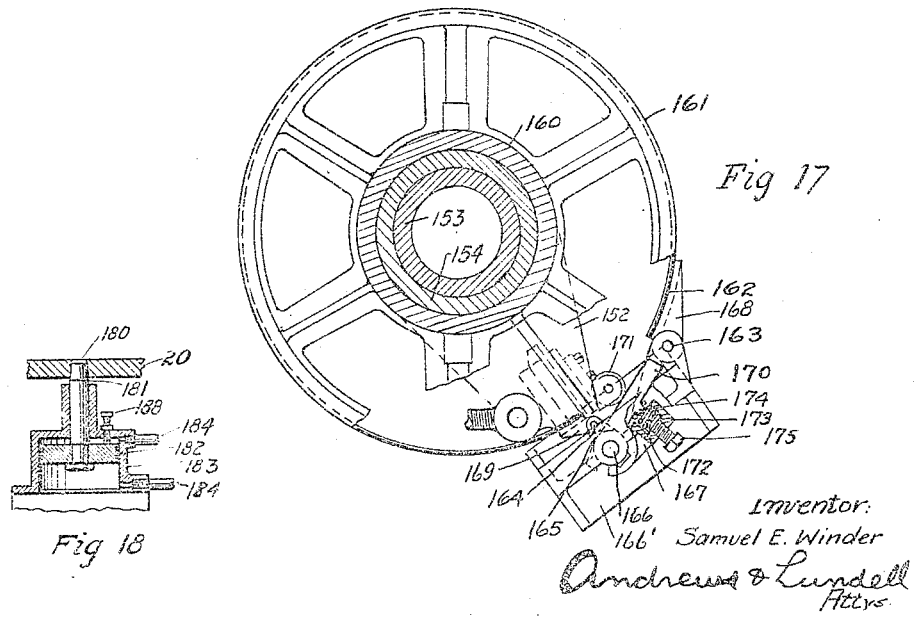

April 22, 1924.

S. E. WINDER 1,491,369

GLASS MANUFACTURING MACHINERY

Filed March 20, 1920    11 Sheets-Sheet 11

Inventor
Samuel E. Winder
Andrew Lindell
Attys

Patented Apr. 22, 1924.

1,491,369

UNITED STATES PATENT OFFICE.

SAMUEL E. WINDER, OF CHICAGO, ILLINOIS.

GLASS-MANUFACTURING MACHINERY.

Application filed March 20, 1920. Serial No. 367,575.

*To all whom it may concern:*

Be it known that I, SAMUEL E. WINDER, a citizen of the United States, residing at Chicago, in the county of Cook and State of Illinois, have invented certain new and useful Improvements in Glass-Manufacturing Machinery, of which the following is a specification.

This invention relates to glass manufacturing machinery, and particularly to such machinery for the purpose of making narrow neck bottles. One of the objects of the invention is to provide a machine which will rapidly manufacture such bottles, and will produce bottles of a high class. Various other objects of the invention relate to certain details with reference to the machine which enable it to be operated at a high rate of speed, and in such a manner as to produce the high grade of bottles desired, and to properly manipulate the molten glass and the finished bottles during the manufacturing process.

Figure 1:
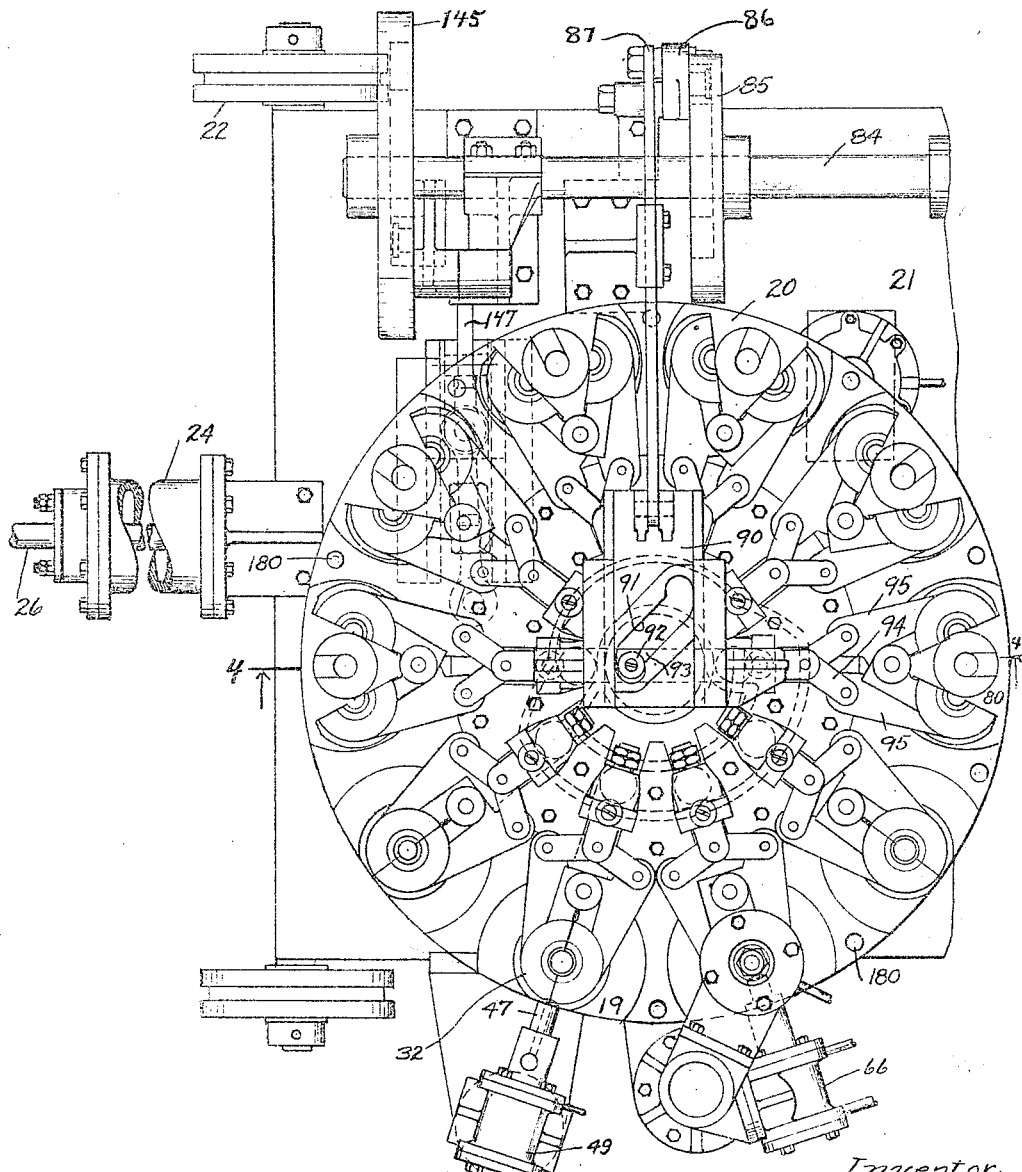
Figure 2:
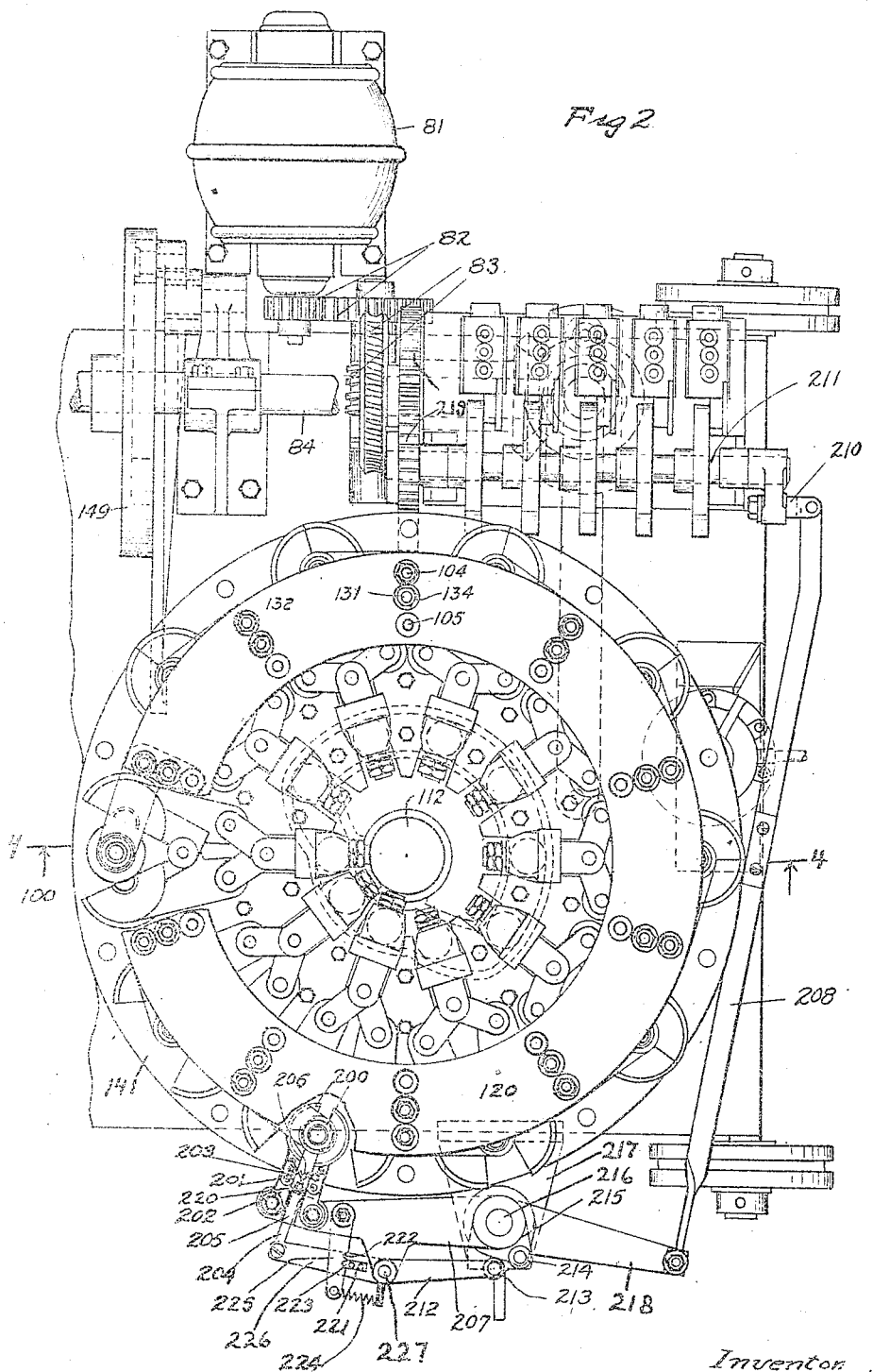
Figure 3:
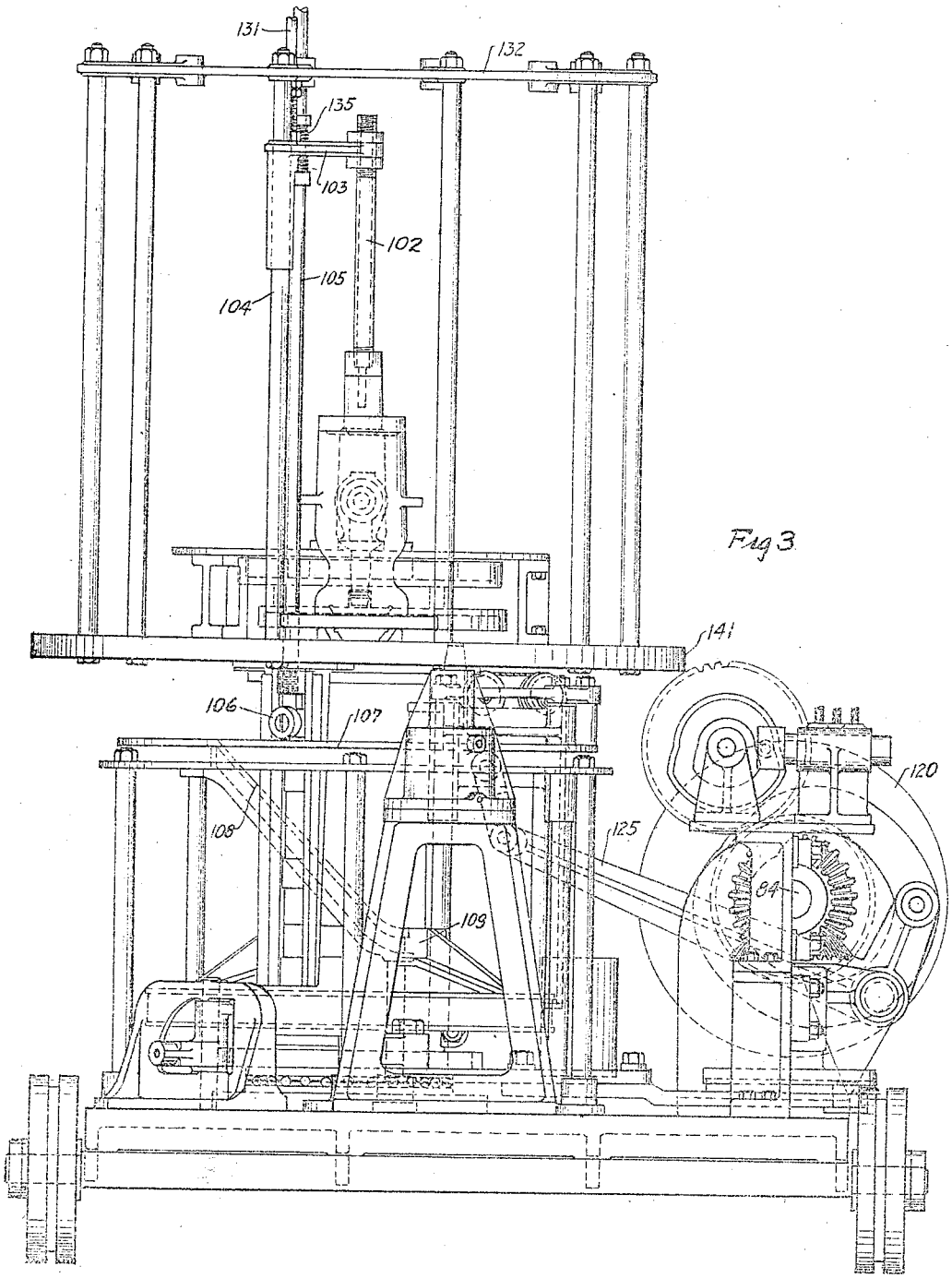
Figure 13:
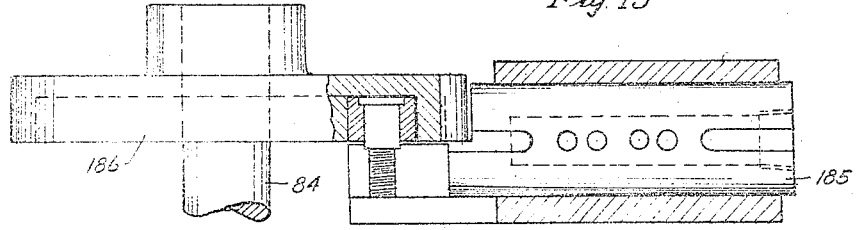
Figure 14:
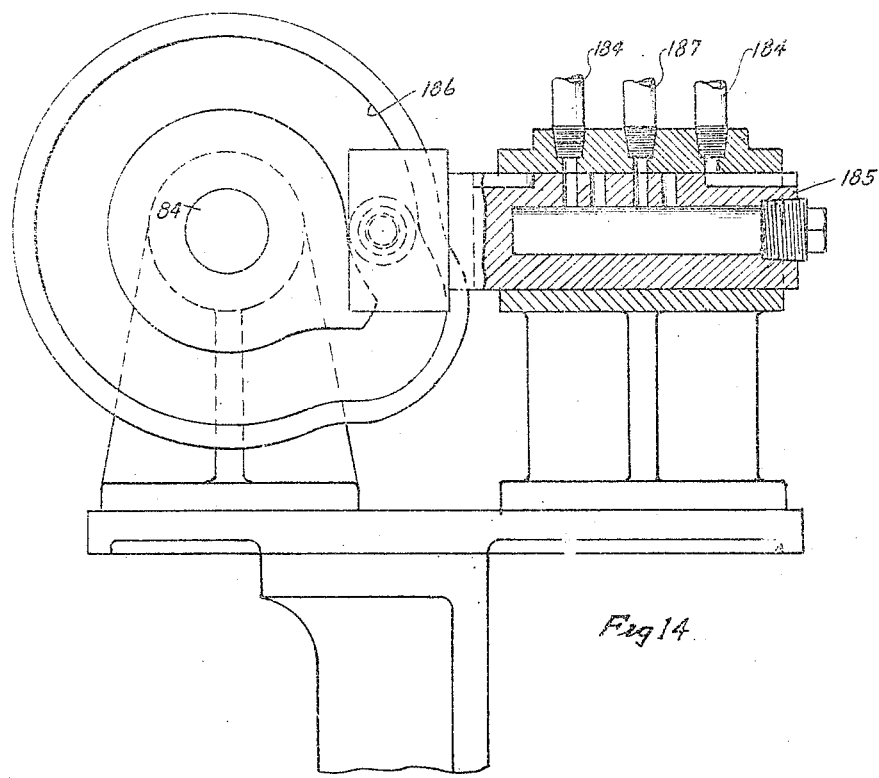
Figure 19:
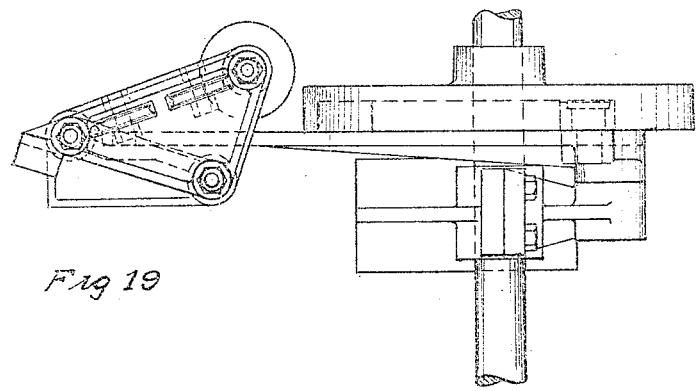
Figure 20:
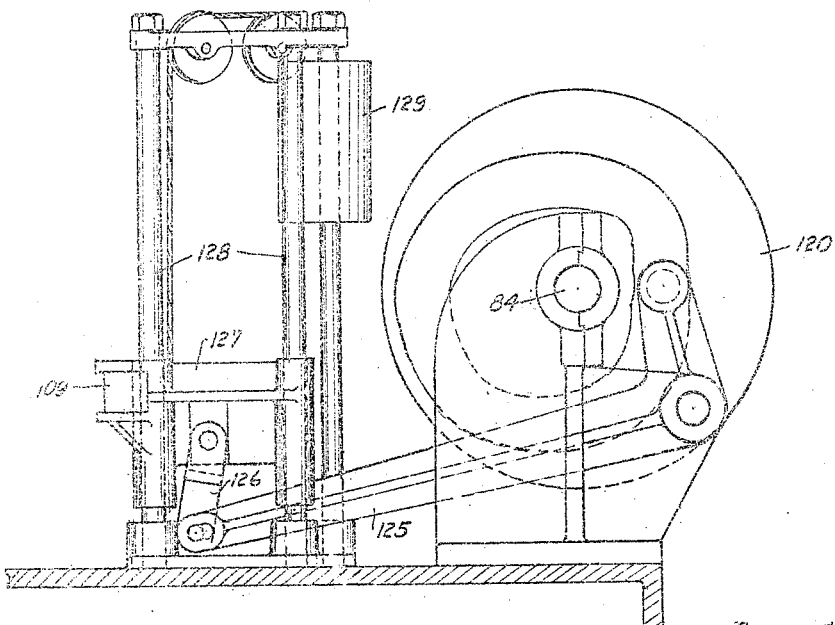

Of the accompanying drawings Figs. 1 and 2 form a plan view of the entire machine, Fig. 2 to be considered as being immediately on the right of Fig. 1, and joined thereto; Fig. 3 is an end elevation of the machine; Figs. 4 and 5 form together a central sectional view of the machine along the lines 4—4 of Figs. 1 and 2, Fig. 5 to be considered as being immediately on the right of Fig. 4, and joined thereto, with certain portions duplicated. Fig. 6 is a detail view of the molten glass delivering mechanism; Fig. 7 is an enlarged detail view of the brake mechanism; Figs. 8 and 9 are fragmental vertical sectional views of portions of the machine; Figs. 10, 11, and 12 are detail views of various mechanism used in opening and closing the molds of the machine. Figs. 13 and 14 are detail views of certain valves used in operating the machine; Figs. 15, 16, 17 and 18 are detail views of various mechanism used in operating the mold tables, of the machine; Figs. 19 and 20 are detail views of certain bottle elevating mechanism used in transferring the partly formed bottles from one mold table to the other.

In carrying out the process of manufacturing glass bottles with this machine, the molten glass which is to be used flows from a furnace, such as is ordinarily used for the purpose, through an outlet in the bottom of the furnace, and masses of molten glass of the proper amount are cut off as the glass flows through the outlet, and these masses are forced by air pressure into molds by means of which the bottles are partly formed into shape. The air pressure is used for forcing the glass mass into the molds and down firmly against the bottom of the mold thus forming the lower end of the mass into what ultimately becomes the mouth of the bottle. Air under pressure is then passed into the mouth of the bottle thus formed, and an elongated recess is formed in the mass, which ultimately is enlarged to form the interior of the bottle. These preliminary steps in the process of manufacturing the bottles are carried on in molds placed on an intermittently rotating table, in this instance ten molds being equally spaced around the outer portion of the table. The process of thus partly molding the glass in these molds is carried on successively; each mold being closed or opened by suitable means as the needs require; and finally, as each mold is rotated to a certain position, the partly molded mass of glass is removed from the mold and is passed into a mold on another rotating table where the bottle is blown and completed. For convenience herein, the table which carries the molds for receiving the glass from the furnace will be called the molding table, and the table the molds of which receive the glass from the molding table will be called the blowing table, as on this table the glass is finally blown to its completed form.

The partly formed bottles are removed, by suitable means, from the molds in the molding table, and are passed into molds on the blowing table, the latter molds when closed being shaped to form the outside of the bottles. When the glass is received in the molds of the blowing table compressed air is passed into the elongated recess formed in the molding table molds, and the glass is blown so as to form the bottle as it finally appears. It has been found that the best results are produced by blowing the bottles for considerable time, so as to insure the glass coming firmly in contact with all portions of the mold, and properly setting before any deformations occur. I therefore have provided means for blowing the glass in the mold of the blowing table which first receives the glass and then to continue the blowing process as the table rotates the mold to other positions until the finished bottle is sufficiently set to be removed. The mold is then opened at the delivering position and the bottle is removed therefrom and transferred by any suitable means to a distance.

Directing attention first to the molding table (Figs. 1 and 4) this comprises a circular table 20 which is rotatably mounted on a frame 21. The frame, which also supports the blowing table, is mounted on wheels 22. The purpose of mounting the frame on wheels is to be able to conveniently move the entire machine away from the glass furnace 23 (Fig. 6,) so as to get at various parts of the machine more conveniently, and for other reasons. Any suitable means may be used for moving the machine. I prefer for the purpose a compressed-air cylinder 24 fixed to the frame of the machine, with the piston 25 therein connected, by means of a piston rod 26, to a suitable fixed portion of the building in which the machine is located.

The glass is formed in an ordinary manner into suitable molten condition in the glass furnace 23 and flows downwardly therefrom through an outlet 27 and between the blades of a pair of shears 30, which are normally open, and, at suitable times, the blades are quickly closed and a portion of the glass is cut off from the stream and is forced into one of the molds 32 mounted on the molding table. The position indicated by the numeral 19, Fig. 1, is the glass receiving position of the mold. To avoid confusion the glass furnace is not shown in this view. But when in operation the outlet 27 (Fig. 6) of the furnace is directly over the mold in the position 19, (Fig. 1).

The means which I provide for cutting off a suitable amount of molten glass from the down flowing stream comprises the shear blades 30 which are fixed to levers 31 pivoted near their central portions by means of a pin 33, fixed to the wall of the furnace. Encircling the pin 33 is a spring 34, the compression of which against the levers may be adjusted by means of the nuts 35. The levers are so formed that the cutting blades hold the central portions of the levers apart somewhat, as indicated in Fig. 6, and hence the compression of the spring at all times tends to hold the two blades close together so that there is a clean shear through the glass at all times, the cutting edges in fact being sharpened by the action of the shears. The rear arms of the levers are connected by links 40 to a piston rod 41 which passes into a cylinder 42 and is fixed to a piston within the cylinder; and, in a well known manner, at the proper time, compressed air is passed into the end of the cylinder to close the blades and cut off the glass, and compressed air is then quickly passed into the other end of the cylinder to open the blades; so that the entire cutting action is extremely rapid, and is timed so that the molten glass passes into the mold at the instant desired. The mold passes under the molten stream just in time to miss striking the lower end of the glass, and the glass is forced into the mold as the mold comes to rest.

The molds 32 of the molding table comprise two complementary members 36, which are pivoted on rods fixed to the table. By suitable means hereinafter described these members are opened or closed according to the requirements, and when closed they form the sides of the complete mold adapted to form the glass into shape for the blowing molds. The bottom of the mold is formed by a split ring 38 which forms in permanent shape the outer portion of the mouth of the bottle, and a tit 39 which forms in permanent shape the end and the inner portions of the mouth. The split ring 38 is removable, so as to be replaced when worn; and the tit 39 is slidably mounted in the base 54 of the mold, for purposes hereinafter set forth; and the mold members 36 are dovetailed to the base when the mold is closed, so as to prevent relative vertical movement of the mold and the base.

The molten glass is forced into the mold and is pressed downwardly therein so as to form the mass into shape for the blow molds, and so as to properly form the mouth of the bottle. For this purpose air pressure is used. By removing the air from below the molten mass of glass in the mold, the outer air pressing downwardly on the glass assists the flow from the furnace outlet and forces the glass firmly into the mold. For this purpose I provide narrow suction slots 29 between the two members of the mold by leaving a slight clearance between the adjacent surfaces of the members, these slots thus being on diametrically opposite sides of the mold, extending upwardly a very material distance, and downwardly between the two members of the split ring; and extending outwardly to a bore 43 on each side of the mold. By means of these suction slots 29 the air is exhausted from the lower end of the mold in the following manner: Connected with any suitable form of vacuum pump, is a pipe 44 (Fig. 8) which is threaded into a casing 45, fixed to the frame of the machine by a pedestal 46. Within the casing 45 is a slidably mounted valve 47 fixed to a piston 50 in the cylinder 49. By means of the pipes 52 and 53, connected with a suitable compressed air valve, such as is hereinafter described, the piston 50 may be forced inwardly or outwardly in the cylinder, and in this manner the valve 47 is correspondingly moved. When the molding table 20 rotates to the glass receiving position, indicated by the numeral 19 in Fig. 1, and comes to rest, the valve 47 is actuated by the piston and is forced against the base 54 of the mold, and an annular chamber 55 in the valve, when the valve is thus forced inwardly, registers with the opening 56, which is in connection with the pipe 44; and a chamber 57, which connects with the annular chamber 55, is brought into registry with a passageway 60 which opens into an annular chamber 59 in the base 54 of the mold; and this chamber connects, by means of the bores 43 and the slots 29, with the lower end of the chamber 40 formed by the two halves of the mold. By this means the chamber of the mold beneath the glass is connected with the means for reducing the air pressure, and the reduced pressure in the bottom of the mold allows the atmosphere to force the glass downwardly, and the glass is thus pulled downwardly from the furnace outlet as the shears operate, and it is then forced down into the mold and the lower end is formed into proper shape for the mouth of the bottle. This formation is produced by means of the tit 39 which projects upwardly into the mold, and which is surrounded by the walls of the ring 38, all of which is of such shape as to suitably form the mouth of the bottle.

When the mouth of the bottle is thus properly formed the piston 50 is forced outwardly by air pressure in the cylinder 49; the valve 47 is thus removed from the base 54 and the mold containing the partly molded glass is then moved to its new position. The mechanism for giving to the molding table a step by step movement is described hereinafter.

As the table is being rotated to the new position the tit 39, in the mouth of the partly formed bottle in the mold which is moving from the position 19, is moved downwardly from the mouth in the following manner: The tit is mounted on the upper end of a slidably mounted member 64, and fixed to the lower end of the member is a roller 68 which runs in a camway 69 fixed to the frame of the machine. This camway is arranged so that the member 68 is held upwardly until the mold moves from the position 19, but so that the member is moved downwardly a slight distance as the mold moves to the next position. Hence when the mold comes to rest in its new position, which may be called the blowing position, the tit is entirely removed from the mouth of the bottle, and the opening in the mouth of the bottle is then in free communication with a chamber 59 beneath the ring 38 (Fig. 9).

When the mold containing the partly formed bottle is brought to rest in this next, or blowing, position air is forced in the mouth of the bottle in order to form a suitable chamber in the bottle for further blowing later. This is carried out as follows: When the table comes to rest a valve 63 is forced against the member 64, by means of a piston 65 in a cylinder 66; and a passageway 67 is thus brought into registry with the passageway 70 which connects with the chamber 59 in the base of the mold. Air under pressure is then passed, from any suitable source of supply, into the passageway 71, and through the annular chamber 72, which is then in registry with the passageway 71, into the passageways 67 and 70, and thence into the chamber 59 and thence into the mouth of the bottle around the tit 39, which in the meantime has been lowered out of the mouth of the bottle as described hereinabove.

As the blowing process proceeds, however, the glass in the upper portion of the mold is forced upwardly, and to properly form the bottom of the bottle and prevent the glass from being blown out from the mold a member 73 is, at this time, positioned and held in the upper end of the mold chamber. This member is fixed to a piston rod 74 which is fixed to a piston 75 in a cylinder 76, the cylinder 76 being mounted on a fixed pillar 78. By suitable means, air pressure is, at the proper time, passed into the upper end of the cylinder 76, and the member 73 is thus forced downwardly during the blowing process in this position of the mold, and, when the process is completed, the air pressure is reduced in the upper end of the cylinder 76, in any suitable manner, and the spring 77 forces the member 73 upwardly away from the mold. At the same time the valve 63 is forced away from the member 64, and the table is again free to move.

The mold is then moved to the next position, and the glass contained therein cools slightly, the mold still being closed; and finally the mold is moved to the position 80, which is the position where the partly formed bottle is removed from the mold and transferred to the blowing table. In order to remove the bottle from the mold means are provided for opening the mold. General mechanism is provided for opening or closing the molds, as may be required, but the general means provided are such as to operate the molds only when the table is in motion. I prefer to keep the mold closed until the table is at rest at position 80, and in order to carry out the process of transferring the partly formed bottle from the molding to the blowing table I provide the following means for opening the mold which operates independently of the movement of the table:

The mechanism of the machine in general may be operated by any suitable driving means. I prefer for the purpose an electric motor 81 fixed to the frame of the machine, and which is geared, by means of spur gears 82 and worm gears 83, to a main driving shaft 84, substantially all of the mechanism being driven directly by the main driving shaft. Fixed to this driving shaft is a cam wheel 85 which is adapted to operate a lever 86, the lower end of the lever being pivoted to the frame of the machine, and the other end being pivoted to a link 87, which is pivoted to a slidably mounted member 90, Fig. 4. The member 90 has a cam way 91 in which plays a cam wheel 92 fixed to a slidably mounted member 93 which has, in its outer end, a slot 88. When the table comes to rest the operation of the cam wheel 85, in conjunction with the cam way 91, causes the slot 88 to be moved inwardly, and the slot thus moves inwardly a pin 89, which forces open the mold which is at the position 80, in the following manner: Each of the molds comprises two halves pivoted by arms 95 to the table, the arms being respectively connected to links 94; and the links are pivoted to a member 98 which is slidably mounted in a casing 99 to which is fixed the pin 89. As a mold comes to rest at the position 80, the pin 89 associated with the mold passes into the slot 88; and, as the pin is forced inwardly by the member 93, the links 94 and arms 95 force the mold members apart, so that the partly formed bottle can be transferred to the mold of the blowing table, as hereinafter described.

After the bottle has been removed from the mold in position 80, the mold, still held open, is moved step by step around to the receiving position 19, the mold being closed about the time it approaches this position. And it is to be understood that all of the molds of the molding table take the same part in the process as each of the other molds on the same table. The particular mechanism used for holding the molds open and for closing them at the proper time is described hereinafter.

It will be seen by Figs. 4 and 5 that the molding table is mounted materially lower than the blowing table, and, when the bottle is to be transferred from the molding table to the blowing table, the mold in position 80 is directly under the mold in the position 100 of the blowing table and into which the bottle is to be transferred. The following air pressure means are used for elevating the bottle from the molding table mold to the blowing table mold: Over each mold of the blowing table a member 101 (Fig. 5) is mounted for vertical movement by means of a pipe 102 fixed to a slidably mounted cross bar 103, the cross bar being guided by the uprights 104 and 131. Connected to the cross bar 103 is a slidably mounted rod 105; and fixed to the lower end of this rod is a roller 106 (Fig. 3) which normally runs on a track 107, thus normally holding the rod 105, and hence the member 101, in their elevated positions. When the bottle is to be elevated from the molding table mold, before the mold containing the bottle is opened, and while the mold which is to receive the bottle is being moved to the position 100, the member 101 is lowered, by means of the runway 107, which, at the proper place, has a downwardly inclined portion 108. When the roller 106 reaches this inclined way 108 it passes down to the lower end thereof, and passes from the runway into an elevator 109 (Fig. 20). This carries downwardly the rod 105 and hence the member 101, while the table is rotating. The member 101 thus passes down through the open mold which is to receive the bottle, and when the mold comes to rest at the position 100 the lower end of the member 101 is immediately above the top of the bottle in the mold 110 (Fig. 5). The roller 106 is then in the elevator 109, and, in a manner hereinafter described, the elevator moves downwardly sufficiently to bring the member 101 in contact with the top of the bottle. The mold 110 is then opened in the manner hereinabove described, so as to release the bottle, and at the same time the atmospheric pressure holds the bottle firmly against the member 101 in the following manner. Within the member 101 is an annular chamber 111 which extends downwardly to the lower end of the member 101 and upwardly so as to connect with a passageway 112. The air pressure is reduced in the chamber 111, and the external air pressure then presses the bottle so firmly against the bottom of the member 111, that the bottle may be raised to its new position, and held there by air pressure during the entire blowing process.

The air pressure may be reduced in the chamber 111 in any suitable manner. I have provided the following preferred means for reducing the air pressure in the chamber: Fixed to the central portion of the blowing table is a non-rotatable member 117, which has a chamber 113 in its central portion, and this chamber is connected, by means of a pipe 114, with any suitable air pressure reducing means, not shown. A passageway 115 in the casing, by means of an annular chamber 118 in the rotatably mounted casing 119, communicates with a plurality of jointed pipe systems 116, the number of pipe systems being equal to the number of molds on the blowing table; and each of these systems is connected with one of the pipes 102 which connects in turn with the passageway 112 of one of the molds. Evidently when the air pressure is reduced in the chamber 113, it will be reduced more or less in each of the pipes 102, and hence in each of the annular chambers 111, which will cause the bottles to be supported by the member 101.

The elevator 109, which controls the elevation of the bottle from the mold 110 in the molding table to the receiving mold of the blowing table, is operated in the following manner: A cam wheel 120, fixed to the main driving shaft 84, operates a lever 125, causing a link 126 to force the elevator 109 upwardly and downwardly as the shaft 84 rotates, the elevator being fixed to a cross head 127, to which the link 126 is pivoted, and being slidably mounted on posts 128 and counter-balanced by a weight 129. When the roller 106 passes off from the track 107, into the elevator it is free to be lowered or raised by the elevator, and, when the blowing table comes to rest, and the roller 106, associated with the member 101 which is to raise the bottle, is in the elevator the cam wheel 120 then lowers the elevator somewhat and allows the member 101 to pass downwardly to, and come in contact with, the upper end of the bottle. The cam wheel then raises the elevator, and hence the member 101, carrying with it the bottle to its new position in the blowing mold as indicated in Fig. 5; and as the blowing table is again rotated the mold is closed around the bottle, and the roller 106 passes from the elevator onto the level upper portion of the track 107.

The bottle is properly positioned in the blowing mold by means of a nut 130 on the upright 131 fixed to the cross bar 103. The nut 130 limits the upward movement of the bottle by coming in contact with the supporting ring 132; and the spring 133, mounted on the rod 105, holds the nut snugly against the ring, and prevents any undue jarring of member 101 and the bottle when the nut strikes the ring. Similarly the nut 134 on the upper end of the upright 130, by striking the ring 132, limits the downward movement of the member 101 as it comes in contact with the bottle and prevents any deformation of the bottle, which at this time is still in a molten condition; while the spring 135 prevents undue jarring of the parts when the nut 134 strikes the ring and holds the member 101 snugly against the bottle until the air pressure becomes effective.

The bottle is now in a position to be completely blown. The means which I provide for blowing the bottle in the blowing table comprises a non-rotatable casing 121 which forms the base of the casing 119. The casing 121 has, in its central portion, a chamber 122 which is connected, by means of a pipe 124, with any suitable air compression means, not shown. A plurality of flexible pipes 136 are connected to the casing 119, or to a member fixed to said casing, and with an annular chamber 123 which connects with the chamber 122; and, thus, by means of the pipes 136, the passageway 122, is connected with each of the passageways 137, in the slidably mounted members 138. As the table moves the mold from the position 100 a passageway 137 is registered with the chamber 139 in the base of the mold, in a manner described hereinafter, thus connecting the chamber 122 with the chamber 139 of the particular mold involved, and suitable air pressure is thus transmitted into the chamber 139 and into the elongated chamber 73 of the bottle, so that the chamber 73 is enlarged to form the chamber 140, and the bottle is thus completely formed. In order to insure complete and proper blowing of the bottles the air pressure in the interiors of the bottles is maintained during most of the time that they are being moved from the position 100, in which they receive the bottles, until they approach the position 120, when the mold is opened and the air pressure shut off.

The air for blowing the bottles is controlled in the following manner: The valve members 138, which, by means of their passageways 137, pass the compressed air into the respective bottles, are slidably mounted on the blowing table 141, and the positions of these valves are controlled by a cam 142 fixed to the non-rotating pillar 143 which rotatably supports the table. As the mold moves from the bottle receiving position 100, (Fig. 5), and after the mold has been closed, the cam forces the valve 138 outwardly until the outer end of the passageway 137 opens into the chamber 139, and thus passes compressed air into the chamber. The cam holds the valve 138 in this open position, as indicated at the right of Fig. 5, until the mold approaches the position 120, (Fig. 2) when the valve is forced inwardly and the compressed air is shut off from the bottle.

The following mechanism is provided for rotating the molding table 20 with a step by step movement so that the molds may be moved from one position to another, and may be allowed to remain at rest a sufficient length of time for properly carrying out the process. And similar mechanism is provided for rotating the blowing table 141, but in the opposite direction. Fixed to the main driving shaft 84 is a cam wheel 145 which operates a lever 146 pivoted by one end to the frame of the machine and by the other end to a link 147. The link 147 is pivoted to a slidable member 150, which, by means of an adjustable connector 151, is pivoted to an arm 152. By these means, as the shaft 84 rotates the arm 152 is reciprocated. The table is mounted on a column 153, fixed to the frame 21, by means of a sleeve 154, which is fixed to the table 20, and which encircles the column. As thus arranged the table is free to rotate around the column 153. The lower end of the sleeve 154 has an annular flange 155 which has notches 156, on its periphery. A pawl 157 (Fig. 15) is slidably mounted in the arm 152, which is rotatably mounted on the column 153, and a spring 158 tends to hold the pawl 157, against the periphery of the flange 155, and thus to force it into the notches 156, the shape of the notches and pawl being such that when the pawl is in the notches movement of the pawl 157 to the right (Fig. 15) will rotate the flange 155, and hence the entire molding table; but when the pawl 157 is forced to the left the beveled edge of the pawl and the notches will allow it to pass out of the notch without rotating the table. Hence as the shaft 84 rotates, the arm 152 will be reciprocated and will thus, by means of the pawl 157, impart to the flange 155 and the molding table 20 a step by step movement, one step of the table being taken for each complete rotation of the driving shaft 84 and hence a complete rotation of the table requiring 10 rotations of the driving shaft. The shape of the cam runway 148 is such that the table is at rest during three-fourths of the time.

The blowing table 141 is rotated in substantially the same manner, by means of a cam wheel 149 (Fig. 2). But the shape of the cam runway of the wheel 149 is such that the table is at rest only one half the time. Both tables start to move at the same time; but the movement of the molding table 20 is twice as fast as that of the blowing table. The molding table is rotated counter clockwise and the blowing table clockwise.

It is desirable in operating the machine, in order to produce bottles rapidly, to start and stop the tables many times a minute; and as each table weighs several tons when fully equipped, and also as each table must be stopped at the right position, I have invented special means for bringing each of the tables to rest. These means, in case of each table comprises a brake, which is operated gradually, as the molds approach the desired position of rest, so as to bring the molds substantially at the positions desired.

I then provide additional means for adjusting the molds to the exact position, and for locking the table in position while it is at rest. The braking means which I have provided for this purpose are as follows:

Encircling the sleeve 154, (Fig. 4), is a collar 160 which is rigidly fixed to the table and which supports a brake drum 161 concentric with the axis of the table. Encircling the brake drum is a band of steel or other suitable material 162 (Figs. 17 and 7) one end of which is fixed to a member 168 which is pivoted by a pin 163 to a bracket 166', the bracket being fixed to the frame of the machine. The other end of the brake band is fixed to a member 169 which is pivoted by a pin 164 to an arm 165 fixed to a pin 166 pivoted to the bracket 166'. Another arm 167 is fixed also to the pin 166, thus forming with said arm 165 substantially a bell crank lever, and a plate 170 is pivoted to the pin 166 and arranged so that, when the free end of the plate 170 is rotated outwardly, it will force outwardly the free end of the arm 167, and will thereby turn the arm 165 so as to tighten the brake strap 162 on the brake drum and tend to bring the brake drum and the molding table to rest.

This tightening, in the manner described, of the brake band is produced automatically in the following manner: A roller 171 is pivoted to the arm 152 and is positioned so that as the arm is reciprocated to the right the roller will come in contact with the plate 170, and will force it outwardly, and will thus gradually tighten the brake band in the manner hereinabove described, and will finally bring the table to rest. In order to avoid shocks, and to more properly tighten the brake band, a spring 172 is mounted on the housing 173 fixed to the arm 167 and encircles a boss 174 fixed to the plate 170, so that, as the plate 170 is forced outwardly by the roller 171, the pressure of the plate on the arm 167 will be transmitted through the spring 172 so as to produce a cushioning effect on the arm 167, and hence on the brake band. The compression of the spring 172 is adjustable by means of the screw 175, and this controls the position of rest.

By these various means the table will be brought to rest with the molds in approximately the desired positions, so that one of the molds of the molding table will be at the glass receiving position 19, substantially under the furnace outlet, and a bottle delivering mold will be at the position 80 substantially under the receiving mechanism of the blowing table. In order to bring the molds to exactly the right position, and to lock the table in position, I provide near the periphery of the table, an opening 180 midway between each two molds, and provide a pin 181 (Fig. 18) to be entered into one of these openings just as the table comes to rest. By having the opening 180 and the entering end of the pin conical, any slight displacement of the table will still allow the pin to enter and to force the table to the proper position. In this connection it should be noticed that, when the arm 152 is moved backward, carrying with it the roller 171, the brake band is released, so that the table can be moved by the pin with less force. The pin may be operated in any suitable manner. I prefer to operate it by a piston 182 to which the pin is fixed. The piston is operated by air pressure in the cylinder 183 which is connected in an ordinary manner, by means of pipes 184, to a compressed air valve 185 (Fig. 13) operated by a cam 186 fixed to the driving shaft 84, compressed air being supplied to the valve by a pipe 187. In order to prevent the pin 181 being forcibly driven into the hole 180, and thereby jarring the table undesirably, or possibly becoming set in the opening, I provide the adjustable stop 188 which limits the upward movement of the piston, so that, while the upper end of the pin may move the table slightly to bring it to the exact position desired, yet the pin cannot strike a blow thereon or bind in the opening, as the portion which is allowed to enter the opening is made slightly smaller than the opening itself.

It is to be understood that the means for rotating the molding table, and also the means for bringing the mold table to rest and centering and locking the table, are all substantially duplicated with reference to the blowing table. However, as the blowing table is rotated in a direction opposite to that of the molding table the driving and braking mechanism is necessarily modified accordingly. Although the two tables are at rest at the same time for a short period, yet neither is necessarily at rest during all the time that the other is at rest the exact time during which each is at rest depending upon the particular portion of the bottle making process which is being carried out by the particular table, it being understood that the time of rest of either table is controlled by the particular shape of the cam wheel which operates the table stopping valve. Further each of the compressed air valves and cams is similar to the one illustrated in Figs. 13 and 14, and is connected, by means of pipes, to its own particular cylinder 42, 49, 66, 76, or 183, as the case may be, yet the exact position of these valves, shown in Fig. 2 and elsewhere, with reference to each other and the pipes and cylinders and other mechanism is immaterial. The valves and the cam wheels are all substantially alike, except that the cam runways of the cam wheels are formed to meet the particular requirements of the mechanism to be operated. To avoid confusion the pipes connecting the valves and the respective cylinders have been omitted. The particular form of valve shown is of value as it is very simple and it prevents leakage of air. This latter is due to the fact that the air cannot leak from the casing directly except past small surfaces, namely the surfaces immediately surrounding the openings in the valve.

The means for opening and closing the molds also is substantially duplicated in the two tables. Any suitable means may be used for this purpose, but I prefer therefor the following, reference being had to the molding table (Fig. 4): As hereinabove described, each of the molds is fixed to an arm 95 which is pivoted to the table and has pivoted to its inner end a link 94. These links are pivoted to a pin 98 slidably mounted in a casing 191, and a spring 192 continuously tends to force the pin 190 outwardly and thus to close the molds by means of the links 94. The movement of the pin, however, is adjustably stopped by means of the nuts 193. If, however, the casing 191 is moved outwardly or inwardly the molds will be closed or opened accordingly. The casing 191 is slidably mounted in guides 194 fixed to the table, and a cam roller 195 is pivoted to each casing. The cam roller plays in a cam way 196, fixed to the pillar 153, and, as the table rotates, carrying with it the rollers 195 in the fixed camway 196, the roller is guided in such a manner as to move the casing 191 to open or close the molds at the proper time.

In order that the mold at the position 80 may be opened while the table is at rest, in the manner hereinabove described, the camway 196 is materially enlarged at this point, as indicated in Fig. 4 and by the dotted lines in Fig. 1, so that the camway will not interfere with the operation of the cam 91 which is adapted to open the mold at the position 80 while the table is at rest. Inasmuch as none of the molds of the blow table is opened or closed while the blow table is at rest, the cam 91 is not duplicated with reference to such table, and the camway 196 is duplicated therein only as is necessary to open and close the molds at the proper time, it being understood that the paths of the camways are not duplicates but are properly formed to operate the molds when desired.

I provide also the following means for removing the completed bottles from the blowing molds and delivering them to any suitable receiving means:

A clamp comprising a pair of jaws 200 (Fig. 2) is mounted adjacent the mold from which the bottle is to be removed. Each of the jaws is fixed to an arm 201 which is fixed to another arm 202; the arm 202 being pivoted to a third 207; and a pair of links 203 are pivoted by one end to each other, and by the other ends to the respective arms of the jaws. A rod 204 slidably mounted in a housing 205, is pivoted to the connected ends of the links 203. It will appear from this arrangement that when the rod 204 is forced inwardly the jaws of the clamp will be forced apart, and when the rod 204 is forced outwardly the jaws will be closed. A spring 206 tends at all times to hold the jaws closed. The housing 205, in which the rod 204 is slidably mounted, is fixed to the outer end of the arm 207, and this arm is fixed to a pin 216 which is pivoted to a bracket 217 fixed to the frame of the machine. Another arm 218 is also fixed to the pin 216, and the arm 218 is reciprocated by means of a link 208 which is pivoted to a crank 210 which is operated by means of the shaft 211, the shaft being operated by the shaft 84 by means of the gears 219. As the shaft 211 rotates, the arm 207 will be rocked, carrying outwardly and inwardly the clamp 200.

Assuming the clamp to be in the position indicated in Fig. 2, and closed around a bottle which is to be removed, rotation of the shaft 211 will operate the arms 218 and 207, and will thus force the clamp outwardly with the bottle; and, as the clamp moves outwardly the arm 207 will carry with it an arm 226 fixed to a pin 227 the pin being pivoted to the arm 207. The arm 226 is pivoted to the rod 204; and another arm 212, also fixed to the pin 227, carries a roller 213. As the arm 207 is rocked the rollers 213 will come in contact with a roller 214 which is pivoted to an arm 215 fixed to the framework of the machine. When the roller 213 comes in contact with the roller 214 the arm 212, which supports the roller, will be forced outwardly; this, by rotating the pin 227, will force the arm 226 inwardly, and the jaws of the clamp will be forced apart thus releasing the bottle and depositing it on any suitable mechanism provided for that purpose. The mechanism which I prefer for the purpose is fully described in my copending application for Patent Serial Number 308,195, filed July 2, 1919.

As the shaft 211 continues to rotate the mold containing the next bottle to be removed will be rotated to a position opposite the clamp 200, and the arm 207 will again be forced inwardly, carrying with it the clamp 200; and, as the clamp approaches the proper position for grasping the next bottle, the pin 220 which forms the pivot for the rod 204 and the links 203, and projects a material distance downward, will strike against the periphery of the table 141, and this will prevent the outer ends of the links 203 from moving inwardly, so that, as the clamp continues to move inwardly, the arms 201 will be operated by the links 203 to close the clamp upon the bottle, it being understood that, at this time, the roller 213 has been moved away from the roller 214, and the arm 212 is at liberty to be rocked by the pin 220, acting on the arm 226.

In order to lock the clamp in its closed and its open positions any suitable mechanism may be provided. I prefer for the purpose a detent 221 which is arranged to enter notches 222 and 223. When in the notch 222 the clamp is locked in its closed position and when in the notch 223 the clamp is locked in its open position. A spring 224, acting on the outer end of the pivoted arm 225, properly holds the arm against the detent.

When the bottle has been removed from the mold, the mold is rotated step by step to the position 100, where it again receives a partly molded bottle from the molding table.

Although I have described with much detail various portions of the machine which I have used to illustrate my invention, yet it is to be understood that modifications therein may be made by those skilled in the art without departing from the spirit of my invention as disclosed by the following claims; and further other applications of various features of my invention may be made; the particular applications which I have made being only to show the use of the invention in the manner which I prefer. In particular the particular braking means which I have described is applicable to many uses other than the one disclosed therein.

I claim as my invention:

1. In a glass molding machine the combination of a rotatably mounted member, reciprocating means for intermittently imparting limited rotary movement to said member, means normally inoperative for resisting said movements, and means operated by said reciprocating means for rendering operative said resisting means.

2. In a glass molding machine the combination of a rotatably mounted member, reciprocating means for intermittently imparting limited rotary movement to said member, means normally inoperative for resisting said movements, and means operated by said reciprocating means for rendering operative said resisting means, said resisting means arranged to offer the greatest resistance just at the end of the moving oscillation of said reciprocating member.

3. In a glass molding machine a rotatable member, means for rotating said member, and means for bringing said member to rest, said latter means comprising a pin fixed to said rotating means and arranged to move with said member, an arm pivoted to said machine and with its free end extending across the path of motion of said pin, and resilient means resisting the movement of said arm away from said path of motion.

4. In a glass molding machine a rotatable table, reciprocating means for imparting a step by step rotary movement to said table, and means for bringing said table to rest at the end of each rotary step, said latter means comprising a member fixed to said reciprocating means, an arm pivoted to said machine and extending across the path of motion of said member, and resilient means resisting the movement of said arm away from the path of motion of said arm.

5. In a glass molding machine a rotatable table, reciprocating means for imparting a step by step rotary movement to said table, and means for bringing said table to rest at the end of each rotary step, said latter means comprising a member fixed to said reciprocating means, an arm pivoted to said machine and extending across the path of motion of said member, resilient means resisting the movement of said arm away from the path of motion of said arm, and table braking means operatively associated with said arm.

6. In a glass molding machine a rotatable table, a brake drum fixed to and coaxial with said table, a brake band encircling said drum, reciprocating means for imparting intermittent rotary movement to said table, a member pivoted to said machine adjacent the periphery of said drum, one end of said band being fixed to said machine and the other end being fixed to said member, an arm abutting against said member and normally extending across the path of motion of a portion of said reciprocating means, whereby when said reciprocating means imparts movement to said table said arm and said member are forced thereby into a rotary movement and said brake band is tightened.

7. In a glass molding machine a rotatable table, a brake drum fixed to and concentric with said table, an arm rotatably mounted on said machine coaxially with said table, a roller mounted on said arm, a member pivoted to said machine adjacent the periphery of said drum, a brake band encircling said drum, one end of said band being fixed to said machine and the other end being fixed to said member, a plate pivoted to said machine coaxially with said member and extending across the path of motion of said roller, and means preventing the rotation of said plate away from said path of motion without rotating said member, whereby said brake is tightened when said roller comes in contact with said plate.

8. In a glass molding machine a rotatable table, a brake drum fixed to and concentric with said table, an arm rotatably mounted on said machine coaxially with said table, a pin mounted on said arm, a member pivoted to said machine adjacent the periphery of said drum, a brake band encircling said drum, one end of said band being fixed to said machine and the other end being fixed to said member, a plate pivoted to said machine coaxially with said member and extending across the path of motion of said pin, and resilient adjustable means preventing the rotation of said plate away from said path of motion without rotating said member.

9. In a glass molding machine, a rotating molding mold table and rotating blowing mold table, a plurality of molds on each of said tables, means for rotating intermittently each of said tables, the edges of said blowing mold table projecting over the edge of said other table, whereby as said tables are actuated one of the molding molds comes to rest immediately under one of said blowing molds, the two molds then being in the elevating position, means for successively elevating glass masses from said lower molds when in the elevating position to said upper molds, said elevating means comprising an elevating member, means for passing said member downwardly through a blowing mold before said member reaches the elevating position, means for lowering said elevating member onto said glass mass after the mold comes to rest in the elevating position, and means for then elevating said member while supporting said glass through the blowing mold.

10. In a glass molding machine, a rotating molding mold table and rotating blowing mold table, a plurality of molds on each of said tables, means for rotating intermittently each of said tables, the edges of said blowing mold table projecting over the edge of said other table, whereby as said tables are actuated one of the molding molds comes to rest immediately under one of said blowing molds in the elevating position, means for successively elevating glass means from said lower molds to said upper molds when they are in the elevating position, said elevating means comprising an elevating member, means for passing said member downwardly through a blowing mold before said member reaches the elevating position, means for lowering said elevating means onto said glass mass after the mold comes to rest in the elevating position, means for then elevating said member while supporting said glass through the blowing mold, in combination with means for blowing said glass mass in the blowing mold while still supported by said elevating means and as said mold is being moved to other positions.

11. In a glass molding machine a rotatable table, means mounted on said table for elevating a mass to be molded, said means consisting of a track having a level portion and an inclined portion, a roller on said track, a grasping member supported by said roller, an elevator arranged to move vertically, and having a roller receiving slot, the inclined portion of said track ending at a point adjacent the path of motion of said elevator, and means for moving said elevator so as to bring said slot into registry with said track end, whereby said roller as the table rotates passes down said inclined portion and into said slot.

12. In a glass molding machine a rotatable table, means mounted on said table for elevating a mass to be molded, said means consisting of a track having a level portion and an inclined portion, a roller on said track, a grasping member supported by said roller, an elevator arranged to move vertically, and having a roller receiving slot, the inclined portion of said track ending at a point adjacent the path of motion of said elevator, means for moving said elevator so as to bring said slot into registry with said track end, whereby said roller as the table rotates passes down said inclined portion and into said slot.

13. In a glass molding machine a rotatable table, means mounted on said table for elevating a mass to be molded, said means consisting of a track having a level portion and an inclined portion, a roller on said track, a grasping member supported by said roller, and elevator arranged to move vertically, and having a roller receiving slot, the inclined portion of said track ending at a point adjacent the path of motion of said elevator, means for moving said elevator so as to bring said slot into registry with said track end, whereby said roller as the table rotates passes down said inclined portion and into said slot, and means for lowering and then elevating said elevator with the roller in said slot while said table is at rest.

14. In a glass molding machine a rotatable table, means mounted on said table for elevating a mass to be molded, said means consisting of a track having a level portion and an inclined portion, a roller on said track, a grasping member supported by said roller, an elevator arranged to move vertically, and having a roller receiving slot, the inclined portion of said track ending at a point adjacent the path of motion of said elevator, means for moving said elevator so as to bring said slot into registry with said track end, whereby said roller as the table rotates passes down said inclined portion and into said slot, means for lowering and then elevating said elevator with the roller in said slot while said table is at rest, and means for bringing said slot finally into registry with the beginning of the level portion of said track, whereby said roller passes onto said track when the table again begins to rotate.

15. In a glass molding machine means for transferring molded articles from said machine, said means comprising a lever mounted for rocking in a horizontal plane, rocking means connected to said lever, clamping means fixed to one end of said lever, a second lever mounted on said lever and for horizontal rocking, means for opening and closing said clamp fixed to one end of said second lever operable as said lever is rocked, means fixed to said machine for rocking said second lever as said first mentioned lever is rocked in one direction, and other means fixed to said machine for rocking said second lever as said first mentioned lever is rocked in the other direction, and means for locking said clamp in its closed and its open positions.

16. In a glass molding machine means for transferring molded articles from said machine, said means comprising a pivoted arm, clamping means mounted on the free end of said arm, means for reciprocating said free end of the arm so as to move said clamp from the receiving position to the delivering position, links pivoted to one end of said clamping means for opening and closing the same, a pin pivotally connecting the other ends of said links, said pin projecting a material distance beyond said link ends, and a member mounted in the path of motion of said projecting pin, whereby as said arm end is moved towards the article to be transferred said pin strikes on the said member and the clamping means are opened to receive the article.

In testimony whereof, I hereunto set my hand.

SAMUEL E. WINDER.